US005251052A

United States Patent [19]

Reyes et al.

[11] Patent Number: 5,251,052

[45] Date of Patent: Oct. 5, 1993

[54] SYSTEM FOR SOLVING BOOLEAN EQUATIONS USING OPTICAL LOOKUP TABLES

[75] Inventors: Roy M. Reyes, Dahlgren; Scott E. Spence, Fredericksburg, both of Va.

[73] Assignee: The United States of America as represented by the Secretary of the Navy, Washington, D.C.

[21] Appl. No.: 939,229

[22] Filed: Sep. 2, 1992

[51] Int. Cl.[5] ............................ G02F 3/00; G06E 3/00

[52] U.S. Cl. ............................ 359/107; 250/214 LS; 364/256.4; 364/822

[58] Field of Search .................. 359/107, 108; 385/16, 385/122; 250/214 LS; 377/102; 364/256.4, 822

[56] References Cited

U.S. PATENT DOCUMENTS

| | | | |
|---|---|---|---|
| 4,751,378 | 6/1988 | Hinton et al. | 250/214 LS |
| 4,754,132 | 6/1988 | Hinton et al. | 250/214 LS |
| 4,800,262 | 1/1989 | Lentine | 250/214 LS |
| 4,904,858 | 2/1990 | LaMarche | 250/214 LS |
| 4,952,791 | 8/1990 | Hinton et al. | 250/214 LS |
| 4,959,534 | 9/1990 | Lentine et al. | 250/214 LS |
| 4,967,068 | 10/1990 | Lentine et al. | 250/214 LS |
| 4,978,842 | 12/1990 | Hinton et al. | 250/214 LS |
| 5,004,325 | 4/1991 | Glass et al. | 359/107 |
| 5,077,483 | 12/1991 | Cloonan et al. | 385/16 |
| 5,093,565 | 3/1992 | Lentine | 250/214 LS |
| 5,153,757 | 10/1992 | Cloonan et al. | 385/16 |
| 5,172,259 | 12/1992 | Cloonan et al. | 385/16 |
| 5,198,656 | 3/1993 | Chirovsky | 250/214 LS |

*Primary Examiner*—Martin Lerner

*Attorney, Agent, or Firm*—John D. Lewis; Jacob Shuster

[57] ABSTRACT

A reconfigurable digital optical lookup table for solving Boolean equations using an array of bistable optical devices is provided. A single light source is divided into a matrix of light beams using binary phase gratings and a lens system. This matrix of beams is modulated by a spatial light modulator symmetric self electro-optic effect device (S-SEED) according to the desired lookup table. The modulated light beams are used to set an S-SEED array with the lookup table. The rows and columns of the S-SEED array are then reset according to the inputs to the Boolean equation. Once all of the inputs have been processed, the S-SEED array will have only one member whose state has not been affected by the inputs, and the value of this S-SEED corresponds to the solution to the Boolean equation. The final result is output by using a matrix of equal intensity light beams and a mask to read out the state of one side of the S-SEEDs, and focusing the result onto a detector.

4 Claims, 4 Drawing Sheets

SYSTEM FOR SOLVING BOOLEAN EQUATIONS USING OPTICAL LOOKUP TABLES

ORIGIN OF THE INVENTION

The invention described herein was made in the performance of official duties by two employees of the Department of the Navy and may be manufactured, used, licensed by or for the Government for any governmental purpose without payment of any royalties thereon.

FIELD OF THE INVENTION

The present invention relates generally to digital optical computers. In particular, it is a system for solving Boolean equations using bistable devices and a digital lookup table.

BACKGROUND OF THE INVENTION

Techniques for solving Boolean equations using electronic technologies have existed for many years. Early implementations used transistor-transistor logic to perform the various digital functions (AND, OR, NEGATE) required to solve Boolean equations. These implementations worked well for small, relatively simplistic equations; however, due to propagation delays within the electronic circuitry, these implementations were unable to scale for more complex equations.

Lookup tables were developed based on the fact that any Boolean equation can be written in the form of a truth table which has an entry for every combination of the variables. These combinations are called minterms and are given a value of 'one' to define the Boolean equation as true for the corresponding state of the variables, or a value of 'zero' to define the Boolean equation as false for the corresponding state of the variables. The function of the lookup table is to use the states of the variables to retrieve the value of the desired minterm in the truth table and therefore solve the Boolean equation. Electronic implementations of lookup tables have been developed and these systems are able to solve much more complex Boolean equations than previous efforts.

All systems for the solution of Boolean equations in the prior art have been either mechanically or electronically based.

SUMMARY OF THE INVENTION

Accordingly, it is an object of the present invention to provide an optical system for solving Boolean equations.

A still further object is to provide an optical system using matrix processing.

It is a further object of the present invention to implement a table lookup for scalability to larger, more complex equations.

In accordance with the present invention, a complete system for solving Boolean equations is provided. The system is a multi-stage optically parallel interconnected device using reconfigurable spatial light modulators with electrical inputs. The stages are the input table stage which loads the lookup table with the Boolean equation minterm data; the variable input stages which reset the appropriate rows or columns for each variable; and the output stage which reads the lookup table to provide a solution to the Boolean equation. This system uses a matrix of Symmetric-Self Electro-optic Effect Devices (S-SEEDs) to hold the values of the lookup table. Inputs to the equation are provided by resetting the elements of the S-SEED matrix to zero according to the values of the variables. Finally, the values of each S-SEED matrix element are read. If an element exists which is non-zero, then the solution to the Boolean equation is one; otherwise the solution to the equation is zero.

BRIEF DESCRIPTION OF THE DRAWINGS

Other objects and advantages of the present invention will become more obvious hereinafter in the specification and drawings, wherein.

DETAILED DESCRIPTION OF THE INVENTION

Figure 1:
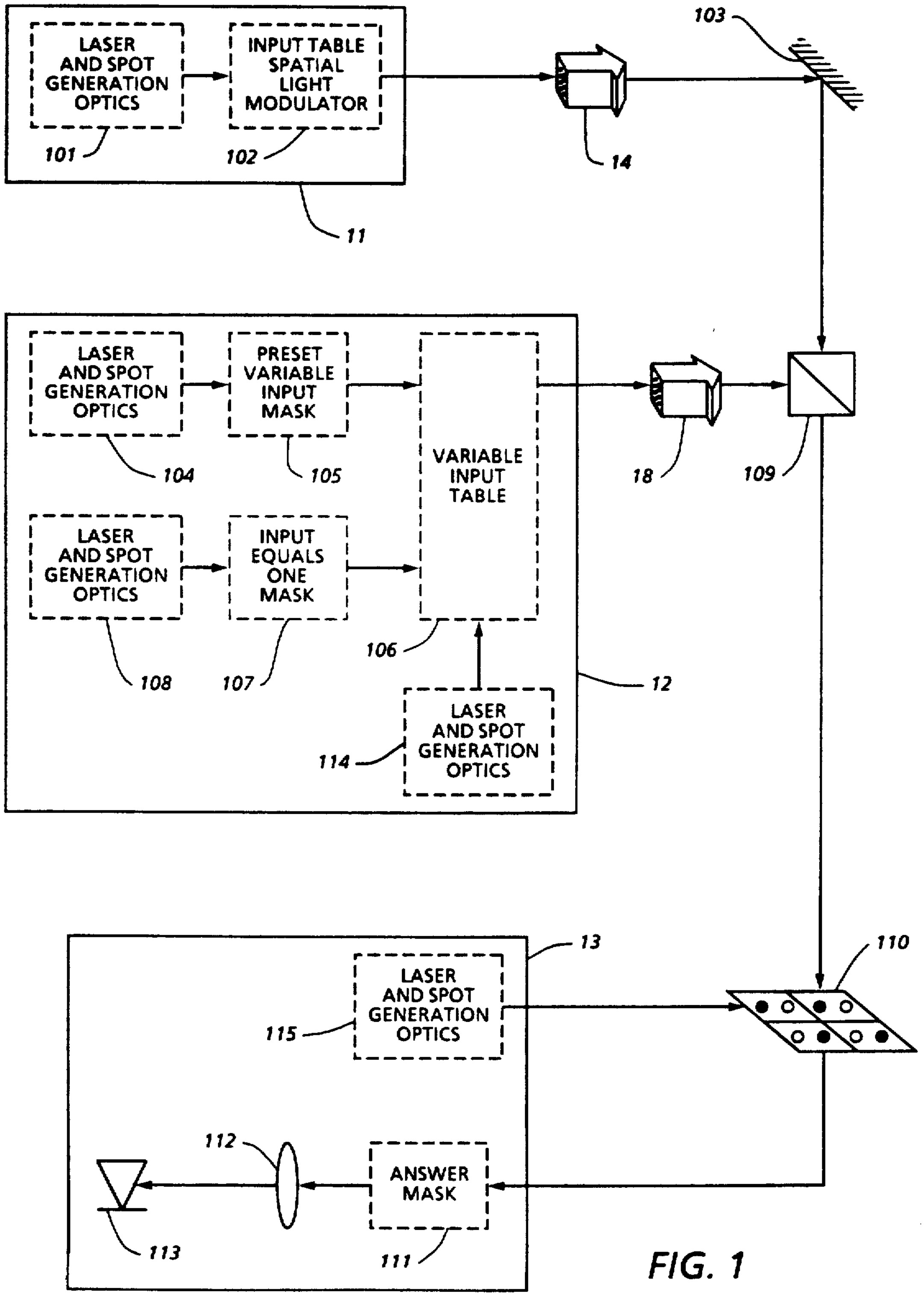
FIG. 1 is a depiction of the complete system including the input table stage, a variable input stage, and the output stage.

FIG. 1 shows the preferred embodiment of the present invention. The complete system is comprised of three major stages: an input table stage 11, a plurality of variable input stages 12 depending on the number of variables in the Boolean equation, and an output stage 13.

The input table stage comprising laser and spot generation optics 101 and spatial light modulator 102 generates table encoded optical data 14 which contains the information for the desired Boolean equation in matrix form. The table encoded optical data 14 is deflected by mirror 103, passes through beam splitter 109, and is imaged on lookup table 110 such that lookup table 110 is configured with the information for the desired Boolean equation in matrix form.

Once lookup table 110 is configured, variable input stage 12 comprising laser and spot generation optics 104, 108, and 114, preset variable input mask 105, input equals one mask 107, and variable input table 106 generates variable encoded optical data 18 which is deflected by beam splitter 109 and imaged onto lookup table 110 such that the elements of lookup table 110 are reset corresponding to the value of the input variable. Variable input stage 12 is repeated once for each variable in the Boolean equation.

After all variable input stages 12 have completed configuring lookup table 110, output stage 13 comprising laser and spot generation optics 115, answer mask 111, lens 112, and detector 113, reads the state of lookup table 110 and provides the solution to the Boolean equation.

Figure 2:
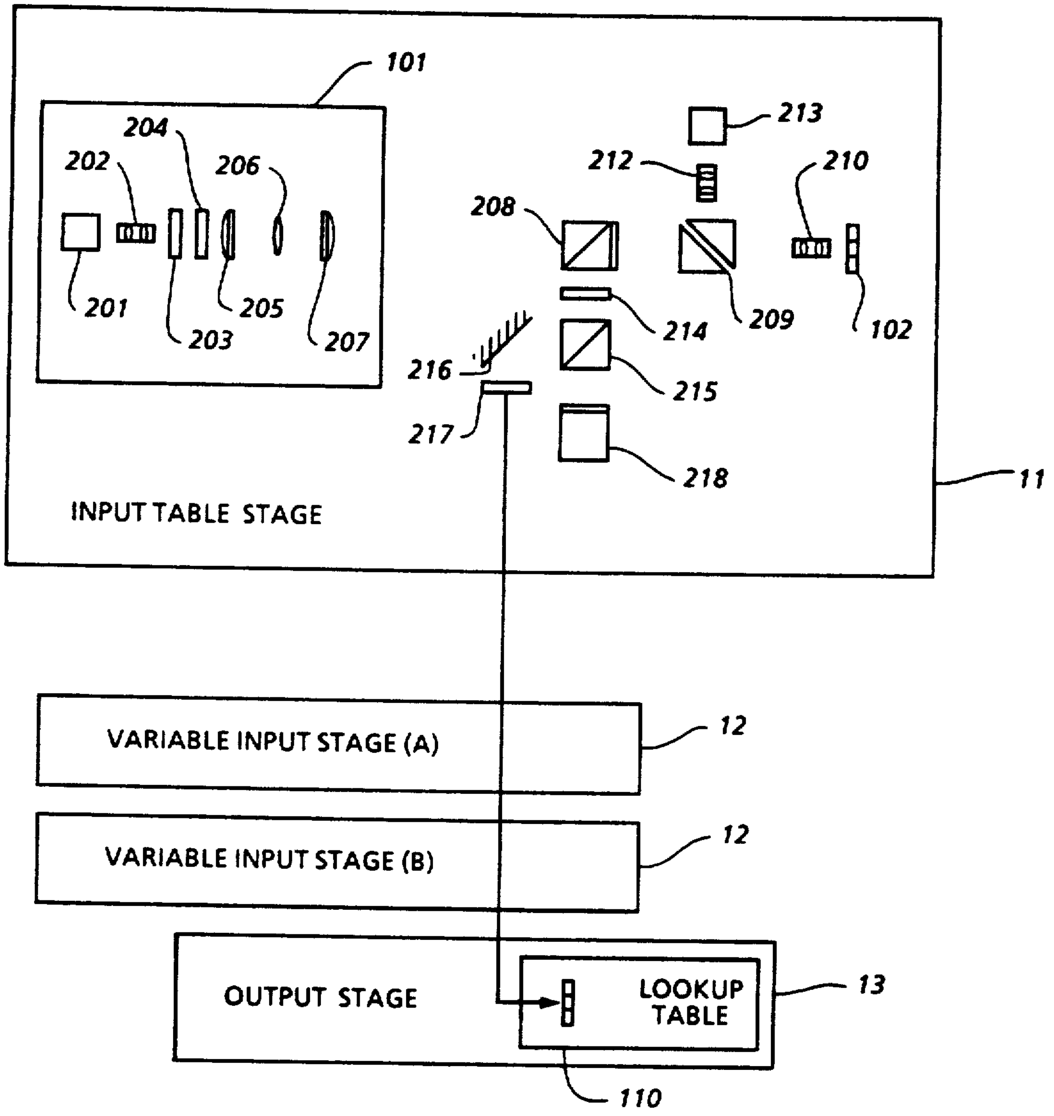
FIG. 2 is a detailed block diagram of the input table stage.

Referring now to FIG. 2, a detailed schematic of the input table stage is shown. During this stage, the Karnaugh map of the Boolean equation is mapped onto the lookup table 110. Prior to initiation of the optical portion of this stage, the lookup table for the Boolean equation is electronically set into spatial light modulator 102. Laser 201 is fired and the generated light passes through lens system 202 to collimate the light and polarizer 203 to eliminate astigmatism. The corrected light passes through binary phase grating 204. Binary phase grating 204 produces the encoded optical data required for writing to spatial light modulator 102. The encoded optical data generated by binary phase grating 204 is either magnified or de-magnified using two achromatic lenses 05 and 207 and bi-convex lens 206. The encoded optical data then passes through polarizing beam splitter with quarter-wave plate 208, non-polarizing beam splitter 209 and infinite conjugate lens system 210. The encoded optical data is reflected off spatial light modulator 102 and passes through infinite conjugate lens system 210, non-polarizing beam splitter 209, and is turned at the polarizing beam splitter with quarter-wave plate 208. The light continues through half-wave plate 214 and reaches the polarizing beam splitter 215 where it is split with one part going to camera 218 for alignment purposes and the remainder going to mirror 216. The light is reflected off mirror 216 and goes through half-wave polarizing beam splitter 217, variable input stages 12, and output stage 13 where it images onto lookup table 110. At this point, the lookup table has been optically transferred from spatial light modulator S-SEED array 102 to lookup table 110.

The remainder of the components in input table stage 11 are for verifying and setting the alignment of the components within the stage and are not required for system operation. LED 213 provides the illumination power and infinite conjugate lens system 212 couples the LED light to spatial light modulator 102 allowing camera 218 to view spatial light modulator 102.

Figure 3:
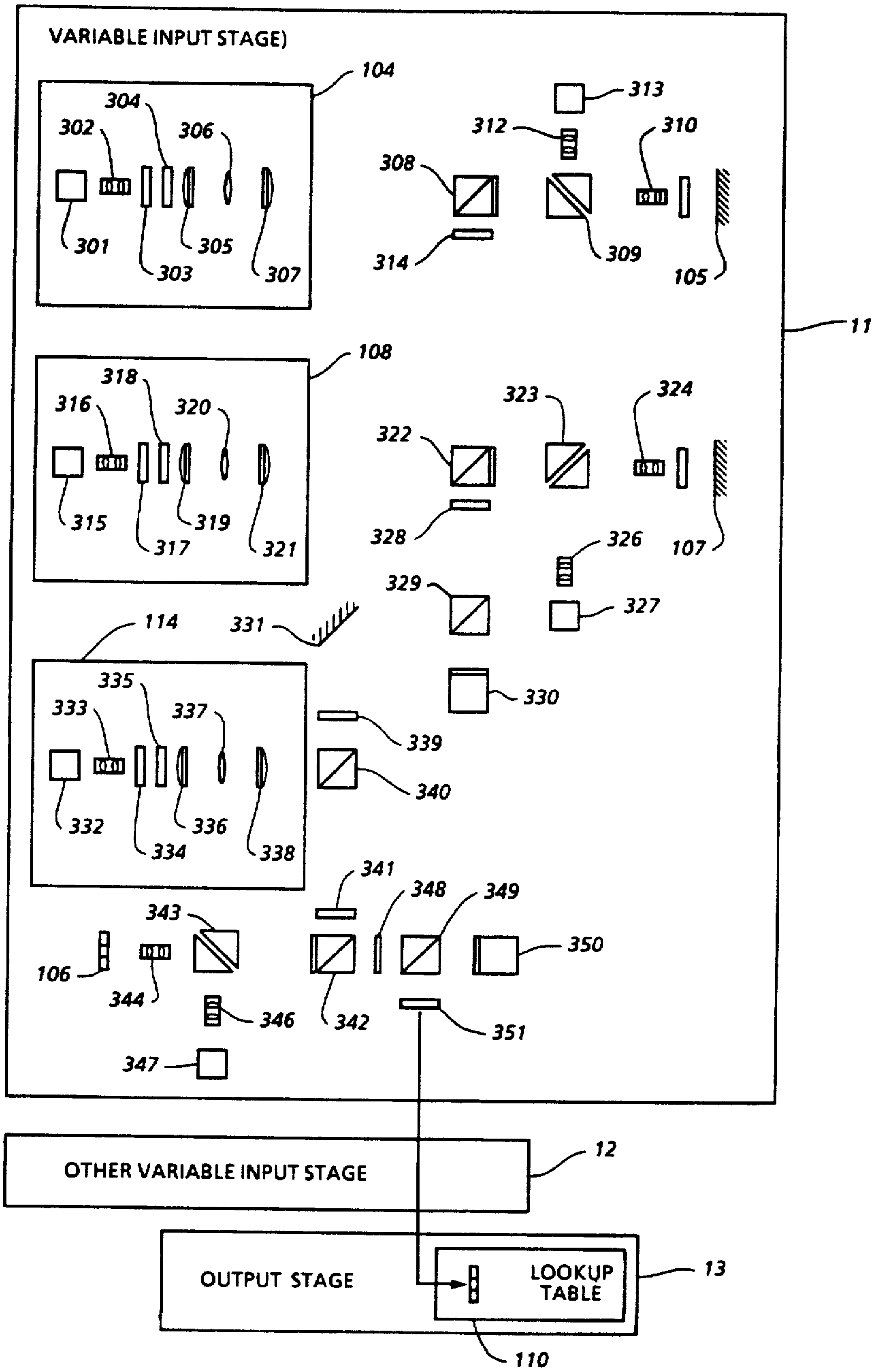
FIG. 3 is a detailed block diagram of the variable input stage.

Referring now to FIG. 3, a detailed schematic of the input variable stage is shown. During this stage the two or more inputs are passed into the system and the rows and columns of the lookup table are reset based on the input as follows:

If the input variable is zero, the rows or columns which corresponding to that variable are reset to zero.

If the input variable is one, the rows or columns corresponding to the inverse of the variable are reset to zero.

In order for the variable inputs to take effect, first laser 301 is fired. The light from laser 301 is collimated by lens system 302 and astigmatism is eliminated by polarizer 303. The corrected light is passed through binary phase grating 304, two achromatic lenses 305 and 307, and bi-convex lens 306 to generate and magnify or de-magnify the encoded optical data. The encoded optical data is then passed through polarizing beam splitter with quarter-wave plate 308, non-polarizing beam splitter 309, infinite conjugate lens system 310, and reflects off preset variable input mask 105 going back through infinite conjugate lens system 310, non-polarizing beam splitter 309, and turning at polarizing beam splitter with quarter-wave plate 308. After the encoded optical data is turned at polarizing beam splitter with quarter-wave plate 308, it then goes through half-wave plate 314, polarizing beam splitter with quarter-wave plate 322, and half-wave plate 328. When the encoded optical data reaches polarizing beam splitter 329, part goes to camera 330 for alignment purposes. The remainder turns at mirror 331 and goes through half-wave plate 339, polarizing beam splitter 340, and half-wave plate 341. The encoded optical data then turns at polarizing beam splitter with quarter-wave plate 342 and goes through non-polarizing beam splitter 343, infinite conjugate lens system 344 and onto variable input table 106, setting its value to a known value from preset variable input mask 105.

If the input value is equal to one, then laser 315 is fired, lens system 316 collimates the light, and polarizer 317 eliminates astigmatism. The light passes through binary phase grating 318, two achromatic lenses 319 and 321, and bi-convex lens 320 to generate and magnify or de-magnify the encoded optical data. The encoded optical data then goes through polarizing beam splitter with quarter-wave plate 322, non-polarizing beam splitter 323, infinite conjugate lens system 324, and reflects off input equals one mask 107 going back through the infinite conjugate lens system 324, non-polarizing beam splitter 323, and turning at polarizing beam splitter with quarter-wave plate 322. After the encoded optical data turns at polarizing beam splitter with quarter-wave plate 322 it goes through half-wave plate 328 and enters polarizing beam splitter 329. Part of the encoded optical data is directed towards camera 330 for alignment purposes, the rest turns at mirror 331 and goes through half-wave plate 339, polarizing beam splitter 340, half-wave plate 341, and turns at polarizing beam splitter with quarter-wave plate 342. The encoded optical data then goes through non-polarizing beam splitter 343, infinite conjugate lens 344 and onto variable input table 106, and thus resets the values for the input rows or columns.

If the input is equal to zero instead of one, then laser 315 is not fired and variable input table 106 retains the original value copied from preset variable input mask 105.

Next, laser 332 is fired, lens system 333 collimates the light, and polarizer 334 eliminates astigmatism. The light passes through binary phase grating 335, two achromatic lenses 336 and 338, and bi-convex lens 337 to generate and magnify or de-magnify the encoded optical data. The encoded optical data then turns at polarizing beam splitter 340, goes through half-wave plate 341 and turns at polarizing beam splitter with quarter-wave plate 342. After the encoded optical data turns at polarizing beam splitter with quarter-wave plate 342, it goes through non-polarizing beam splitter 343 and infinite conjugate lens system 344 to reflect off variable input table 106. The reflected encoded optical data then goes back through infinite conjugate lens system 344, non-polarizing beam splitter 343, polarizing beam splitter with quarter-wave plate 342, half-wave plate 348, and splits at polarizing beam splitter 349. Part of the encoded optical data goes to camera 350 for alignment purposes; the other part of the encoded optical data goes through half-wave plate 351, all remaining variable stages 12, and output stage 13 to lookup table 110. Thus the light resets the appropriate rows or columns of lookup table 110.

The same procedure is followed for each input, and as a result lookup table 110 will have all its elements reset except the one minterm that corresponds to the answer.

The remainder of the components in variable input stage 12 are for verifying and setting the alignment of the components within the stage and are not required for system operation. LED 313 provides the illumination power and infinite conjugate lens system 312 couples the LED light to preset variable input mask 105 allowing camera 330 to view the preset variable input mask 105. LED 327 provides the illumination power and finite conjugate lens system 326 couples the LED light to input equals one mask 107 allowing camera 330 to view input equals one mask 107. LED 347 provides the illumination power and finite conjugate lens system 346 couples the LED light to variable input table 106 allowing camera 350 to view variable input table 106.

Figure 4:
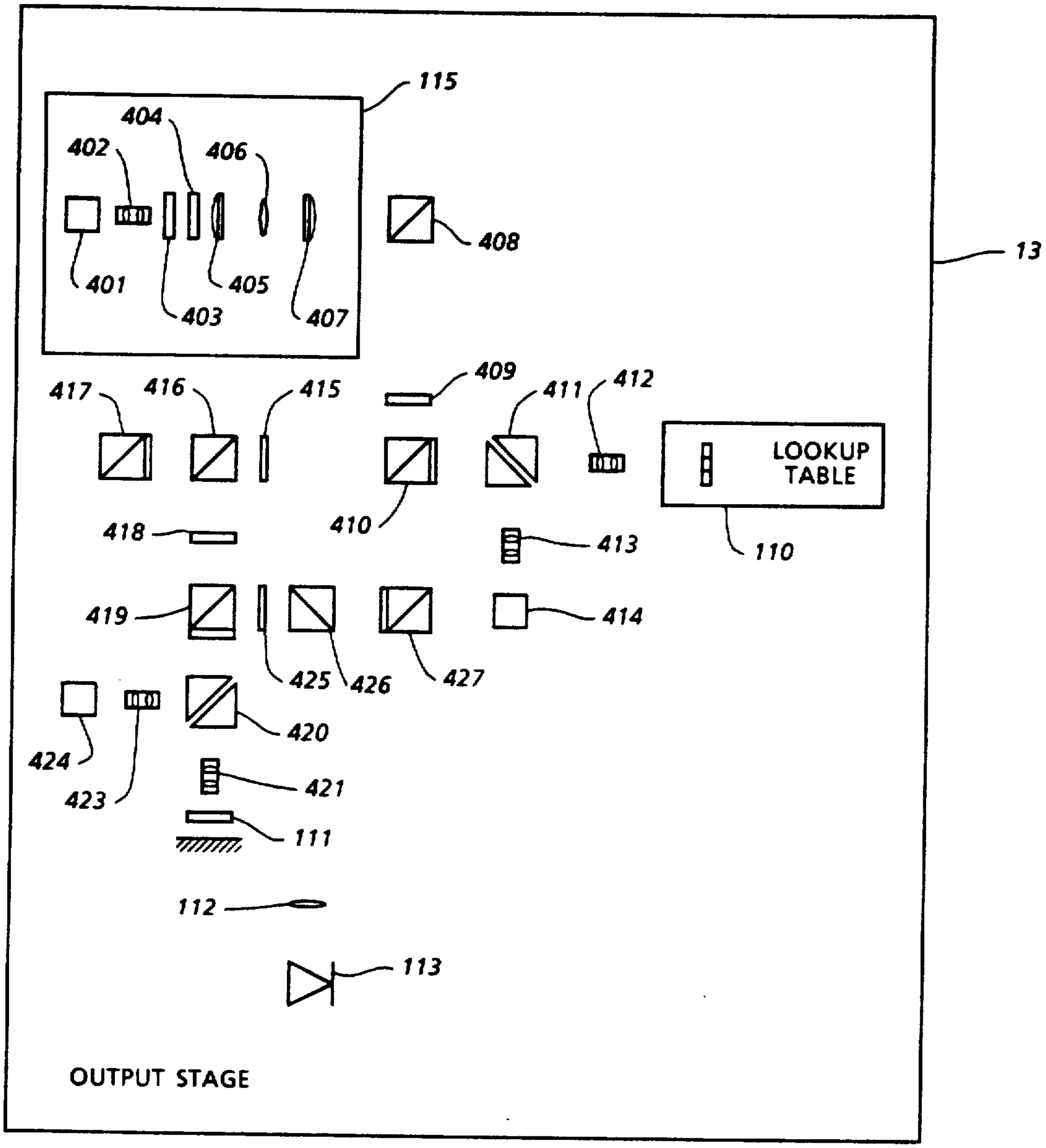
FIG. 4 is a detailed block diagram of the output stage.

Referring now to FIG. 4, a detailed schematic of the output stage is shown. In this stage, in order to obtain the solution to the Boolean equation, laser 401 is fired, lens system 402 collimates the light, and polarizer 403 eliminates astigmatism. The light passes through binary phase grating 404, two achromatic lenses 405 and 407, and bi-convex lens 406 to generate and magnify or de-magnify the encoded optical data. The encoded optical data turns at polarizing beam splitter 408, goes through half-wave plate 409, turns at polarizing beam splitter with quarter-wave plate 410, goes through non-polarizing beam splitter 411, infinite conjugate lens system 412, and reflects off lookup table 100. The reflected encoded optical data goes through infinite conjugate lens system 412, non-polarizing beam splitter 411, polarizing beam splitter with quarter-wave plate 410, half-wave plate 415 and enters polarizing beam splitter 416. Part of the encoded optical data goes to camera 417 for alignment purposes and part goes through half-wave plate 418. The encoded optical data which passed through half-wave plate 418 goes through polarizing beam splitter with quarter-wave plate 419, non-polarizing beam splitter 420, infinite conjugate lens system 421, and reflects off answer mask 111 going back through the infinite conjugate lens system 421, non-polarizing beam splitter 420, and turning at polarizing beam splitter with quarter-wave plate 419. The encoded optical data continues through half-wave plate 425 and splits at polarizing beam splitter 426. Part of the light goes to camera 427 for alignment purposes; the other part of the light is focused by lens 112 into detector 113.

The remainder of the components in output stage 13 are for verifying and setting the alignment of the components within the stage and are not required for system operation. LED 424 provides the illumination power and finite conjugate lens system 423 couples the LED light to answer mask 111 allowing camera 427 to view answer mask 111. LED 414 provides the illumination power and infinite conjugate lens system 413 couples the LED light to lookup table 110 allowing camera 417 to view lookup table 110.

There are several novel features of the present invention. First the system solves complex Boolean equations by using an electro-optical table lookup. The methodologies for solving the equation allow all the corresponding minterms to be reset based on the value of the input variable in parallel. Additionally, due to the use of the electronically configurable spatial light modulator S-SEED, the system can be reprogrammed for any Boolean equation. Further, the present invention accomplishes the solution to the Boolean equation in an optical environment which can be used as part of complex optical computing systems or as a complement to electronic computing systems. However, functionally equivalent systems using flip-flops (either electro-optical, pure optical, or pure electronic) may be substituted for the S-SEEDs in the lookup table within the scope of the invention. Thus, it will be understood that many additional changes in the details, materials, steps, and arrangement of parts, which have been herein described and illustrated in order to explain the nature of the invention may be made by those skilled in the art within the principle and scope of the invention as expressed in the appended claims.

What is claimed is:

1. An optical system for solving Boolean equations comprising:
   - a lookup table comprising a matrix of symmetric-self elctro-optic effect devices;
   - an input table stage comprising spot generation optics providing input to a spatial light modulator, wherein the output of said input table stage is input to said lookup table;
   - a plurality of variable input stages comprising spot generation optics providing an input to a preset variable input mask which in turn is connected as an input to a variable input table, wherein the outputs of said variable input stages are connected as inputs to said lookup table; and
   - means for reading the output result from said lookup table.

2. An optical system for solving Boolean equations as in claim 1 wherein said spot generation optics generate spots corresponding to a binary representation of any Boolean equation.

3. An optical system for solving Boolean equations as in claim 1 wherein said variable input stages are optical systems which force a reset of each element in said lookup table based on the values of the input variables to the equation and the initial states of said lookup table.

4. An optical system for solving Boolean equations as in claim 1 wherein said means for reading the output result from said lookup table is an optical system which masks the output from each element in said lookup table to determine the final value of said Boolean equation.

* * * * *